United States Patent
Lin et al.

(10) Patent No.: US 11,354,801 B2
(45) Date of Patent: Jun. 7, 2022

(54) METHOD FOR DETECTING TUMOR BY IMAGE ANALYSIS, DEVICE USING METHOD, AND NON-TRANSITORY STORAGE MEDIUM

(71) Applicant: HON HAI PRECISION INDUSTRY CO., LTD., New Taipei (TW)

(72) Inventors: Tzu-Chen Lin, New Taipei (TW); Chin-Pin Kuo, New Taipei (TW); Tung-Tso Tsai, New Taipei (TW); Guo-Chin Sun, New Taipei (TW); I-Hua Chen, New Taipei (TW); Wan-Jhen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 241 days.

(21) Appl. No.: 16/788,577

(22) Filed: Feb. 12, 2020

(65) Prior Publication Data
US 2021/0012485 A1 Jan. 14, 2021

(30) Foreign Application Priority Data
Jul. 10, 2019 (CN) .......................... 201910621818.8

(51) Int. Cl.
*G06K 9/00* (2022.01)
*G06T 7/00* (2017.01)
(Continued)

(52) U.S. Cl.
CPC .............. *G06T 7/0012* (2013.01); *G06T 7/11* (2017.01); *G06T 7/223* (2017.01);
(Continued)

(58) Field of Classification Search
None
See application file for complete search history.

(56) References Cited

U.S. PATENT DOCUMENTS

2018/0075628 A1* 3/2018 Teare .................... G06K 9/6274
2019/0251694 A1* 8/2019 Han ....................... G06T 3/0068
(Continued)

FOREIGN PATENT DOCUMENTS

| CN | 107578402 A | 1/2018 |
| CN | 109919859 A | 6/2019 |

OTHER PUBLICATIONS

Hashemi, Seyed Raein, et al. "Asymmetric loss functions and deep densely-connected networks for highly-imbalanced medical image segmentation: Application to multiple sclerosis lesion detection." IEEE Access 7 (2018): 1721-1735. (Year: 2018).*

(Continued)

*Primary Examiner* — Sean M Conner
(74) *Attorney, Agent, or Firm* — ScienBiziP, P.C.

(57) ABSTRACT

A method for detecting a tumor from images which are required to be shrunken in resolution obtains one or more first images. Then, the method segments or divides the detection images into a number of detection image blocks according to an input size of training data of a convolutional neural network architecture, before segmenting, each of the plurality of detection image blocks comprising coordinate values. The detection image blocks are input into a preset tumor detection model to generate image blocks of a result of the detection images. The method merges the image blocks into a single image according to the coordinate values of each detection image block. Colors of normal areas, abnormal areas, and overlapping areas of the abnormal areas are all different. The method generates a final detection according to color depths in the image. A tumor detection device and a non-transitory storage medium are provided.

18 Claims, 5 Drawing Sheets

(51) Int. Cl.
*G06T 7/11* (2017.01)
*G06T 7/223* (2017.01)

(52) U.S. Cl.
CPC .............. *G06T 2207/10024* (2013.01); *G06T 2207/20021* (2013.01); *G06T 2207/20081* (2013.01); *G06T 2207/20084* (2013.01); *G06T 2207/20112* (2013.01); *G06T 2207/20221* (2013.01); *G06T 2207/30096* (2013.01)

(56) References Cited

U.S. PATENT DOCUMENTS

2019/0295252 A1\* 9/2019 Fuchs .................. G06K 9/6224
2020/0258223 A1\* 8/2020 Yip ........................ G06N 3/084
2020/0357506 A1\* 11/2020 Liao ..................... G06N 3/0454

OTHER PUBLICATIONS

Park, Eunsoo, et al. "Patch-based fake fingerprint detection using a fully convolutional neural network with a small number of parameters and an optimal threshold." arXiv preprint arXiv:1803.07817 (2018). (Year: 2018).\*

\* cited by examiner

METHOD FOR DETECTING TUMOR BY IMAGE ANALYSIS, DEVICE USING METHOD, AND NON-TRANSITORY STORAGE MEDIUM

FIELD

The subject matter herein generally relates to image processing technology, and particularly, to a tumor detecting device and method, and a non-transitory storage medium.

BACKGROUND

Limitations on an input size of training data of a convolutional neural network algorithm model are generally needed, if images with high resolution, for example 5000*4000 pixels, are directly input as the training data, otherwise the time of the training may become longer and the efficiency of the training lowered. Thus images with high resolution must be resized to the input size of the training data and then analyzed. However, the resized image may lose details due to the shrinking, thus the tumor detecting method in the prior art may be able to detect the existence of a tumor according to the image, but cannot accurately know the location and other details of the tumor. Such low-resolution images may not be useful to the health-care professionals to further process the tumor.

BRIEF DESCRIPTION OF THE DRAWINGS

Implementations of the present technology will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device.

The term "comprising" means "including, but not necessarily limited to"; it specifically indicates open-ended inclusion or membership in a so-described combination, group, series, and the like.

Embodiments of the present disclosure will be described with reference to the accompanying drawings.

Figure 1:
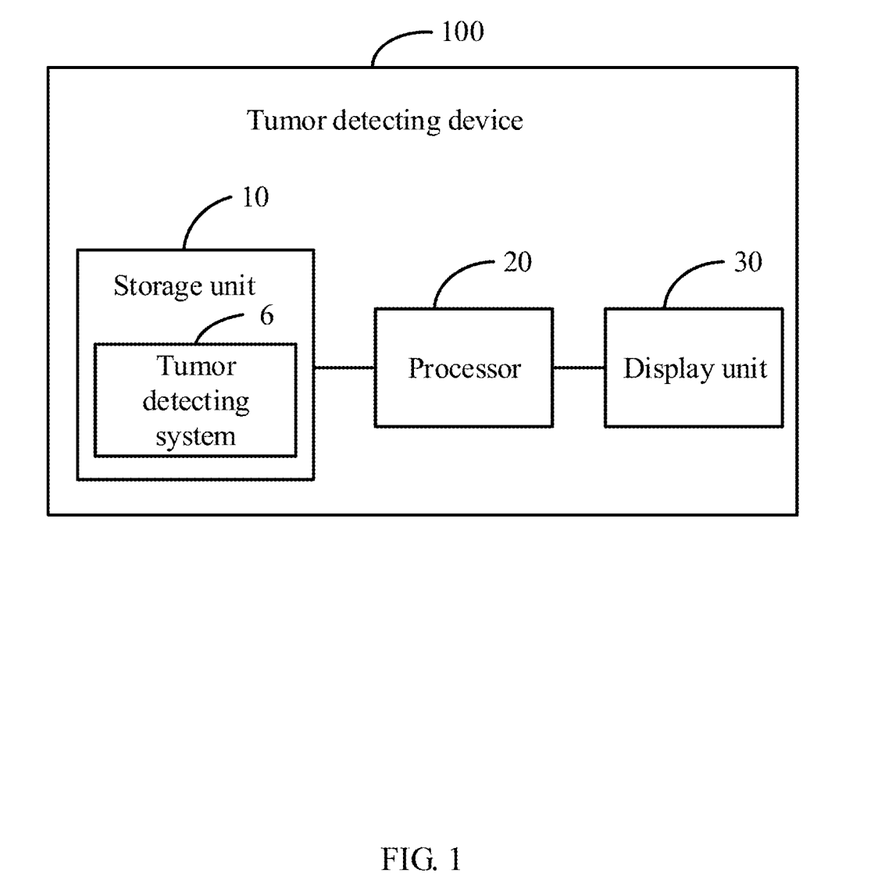
FIG. 1 illustrates a block view of an embodiment of a tumor detecting device.

FIG. 1 illustrates a block view of an embodiment of a tumor detecting device. The tumor detecting device 100 is configured to detect tumor in lung and accurately determine the location of the tumor according to the image.

It can be understood that, the lung tumor can be only taken as an example, a lung tumor is not to be considered as limiting the scope of the embodiments described herein. The tumor is not limited to the lung tumor, the tumor can be other types of tumor, such as heart tumor, liver tumor, stomach tumor, brain tumor, kidney tumor, organs tumor, or the like.

The tumor detecting device 100 includes a storage unit 10, at least one processor 20, and a display unit 30. The display unit 30 and the storage unit 10 are coupled to the at least one processor 20.

The storage unit 10 is configured to store various data of the tumor detecting device 100, for example one or more historical images, one or more detection images, one or more results of detection, and so on. In the embodiment, the storage unit 10 can include, but is not limited to, the read-only memory, random access memory, programmable read-only memory, erasable programmable read-only memory, one-time programmable read-only memory, electrically-erasable programmable read-only memory, compact disc read-only memory, or other optical disc memory, disk memory, tape memory, or any other medium capable of carrying or storing the program codes.

The at least one processor 20 can be central processing unit, microprocessor, digital processing chip, or any other processing chip capable of executing the data processing function.

The display unit 30 is configured to display image of result of detection of the tumor detecting device 100, or the like. In the embodiment, the display unit 30 can be any display, for example a touch display, a liquid crystal display, or the like.

Figure 2:
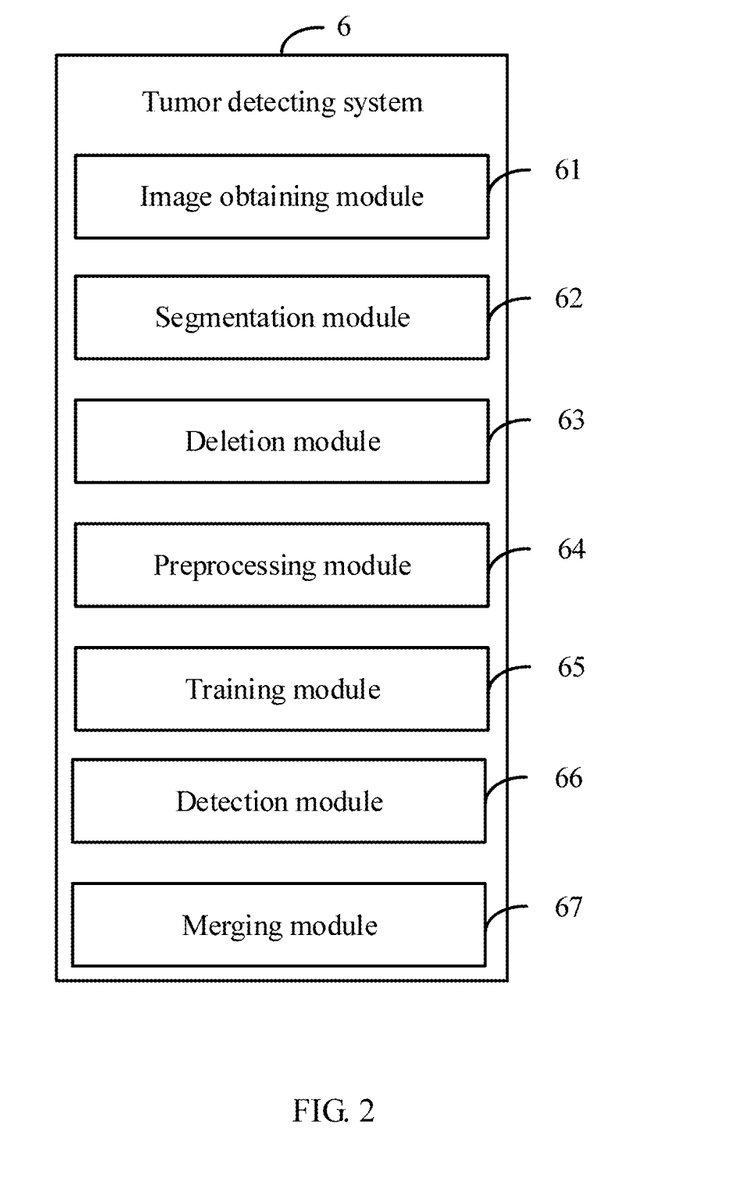
FIG. 2 illustrates a block view of a tumor detecting system in an embodiment of the tumor detecting device of FIG. 1.

Referring also to FIG. 2, a tumor detecting system 6 is run on the tumor detecting device 100. FIG. 2 illustrates a block view of an embodiment of the tumor detecting system of the tumor detecting device. In the embodiment, the tumor detecting system 6 includes a series of program instructions in the form of procedures. The program instructions in the form of procedures are stored in the storage unit 10 and executed by the at least one processor 20 to accomplish the object of the present disclosure. The tumor detecting system 6 can include an image obtaining module 61, a segmentation module 62, a deletion module 63, a preprocessing module 64, a training module 65, a detection module 66, and a merging module 67.

The image obtaining module 61 is configured to obtain an image. The image can be a historical image or a detection image.

In the embodiment, the image can be a thin-section image with high resolution of the lung. It can be understood that the image is not so limited, the image can be a thin-section image with high resolution of the heart, the liver, the stomach, the brain, the kidney, or the organs.

The segmentation module 62 is configured to segment the historical image into a number of historical image blocks according to the input size of the training data of the convolutional neural network architecture. The segmentation module 62 is further configured to segment the detection image into a number of detection image blocks satisfying the input size of the training data according to the input size of the training data of the convolutional neural network architecture, before segmenting, each detection image block comprising coordinate values, each detection image block partially overlapping with one or more of adjacent detection image blocks. In the embodiment, the segmentation module 62 is further configured to determine the coordinate values of each detection image block before segmenting.

In the embodiment, each detection image block is square. Each detection image block can be any other suitable shape, for example rectangle, or the like. Each detection image block overlaps a half size of a longitudinally adjacent one of the detection image blocks and a half size of a widthwise adjacent one of the detection image blocks, and a quarter size of a diagonally adjacent one of the detection image blocks.

It can be understood that, in other embodiments, each detection image block overlaps a quarter size of the longitudinally adjacent one of the detection image blocks or the widthwise adjacent one of the detection image blocks.

The deletion module 63 is configured to delete one or more historical image blocks comprising background of more than 50% of an entire historical image block segmented from the historical image.

The preprocessing module 64 is configured to expand a scale of the historical image block based on an image augmentation technology. The image augmentation technology can be at least one of a group consisting of image distortion, image flipping, image color and space changing, and image transformation.

In the embodiment, the image augmentation technology marks a series of random changes to the training images to produce similar but different training examples, to expand the scale of the training data.

The training module 65 is configured to train the convolutional neural network architecture with the historical image blocks to create a tumor detection model. The convolutional neural network architecture includes, but is not limited to ResNet, AlexNet, VGG, Inception, and so on.

The detection module 66 is configured to input the detection image blocks to the tumor detection model to generate the image blocks of a result of the detection image.

The merging module 67 is configured to merge the image blocks of the result of detection image into a single image according to the coordinate values of each detection image block.

In the embodiment, the merging module 67 is further configured to judge and generate a result of detection according to the color depths of the image blocks in the single image displayed on the display unit.

For example, in the embodiment, in the single image, white is normal, gray is abnormal, and grayscale color depth represents a gradient of infection of the lung tumor.

Figure 3:
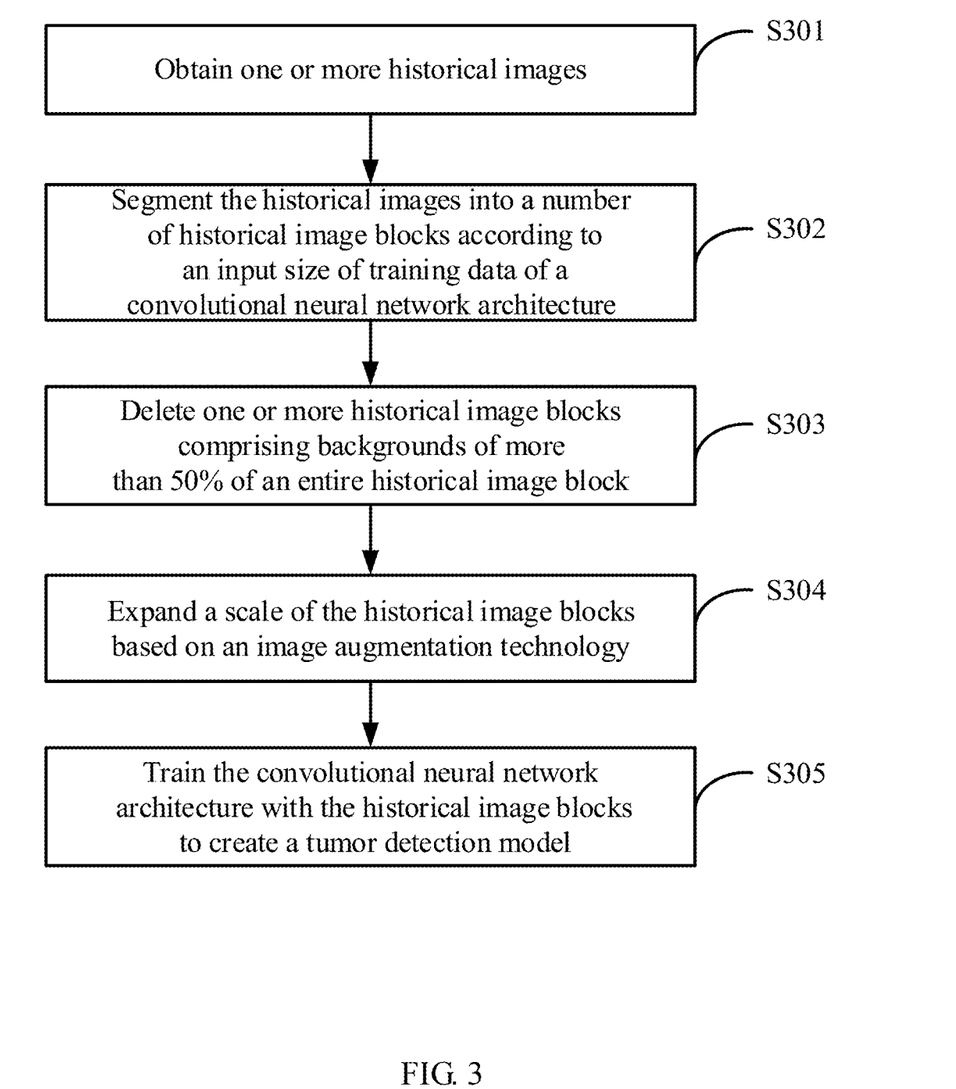
FIG. 3 illustrates a flowchart of an embodiment of a method for creating model for tumor detection.

FIG. 3 illustrates a flowchart of an embodiment of a method for creating tumor detection model. The method for creating tumor detection model can begin at block S301.

At block S301, obtaining one or more historical images.

In the embodiment, the historical images can be thin-section images with high resolution of the lung. It can be understood that the historical images are not limited to such images, the historical images can be thin-section images with high resolution of kidney, stomach, or the like.

At block S302, segmenting the historical images into a number of historical image blocks according to the input size of the training data of a convolutional neural network architecture.

In the embodiment, the method includes segmenting the historical images into a number of historical image blocks satisfying the input size of the training data according to the input size of the training data of the convolutional neural network architecture.

At block S303, deleting one or more historical image blocks comprising backgrounds of more than 50% of an entire historical image block.

In the embodiment, the method is not limited to deleting one or more historical image blocks with such backgrounds, the method can delete one or more historical image blocks comprising backgrounds of more than 60% of the entire historical image block, or the like.

At block S304, expanding a scale of the historical image blocks based on the image augmentation technology. The image augmentation technology can be at least one of a group of image distortion, image flipping, image color and space changing, and image transformation.

In the embodiment, the method expands a scale of the historical image blocks of the training data based on the image augmentation technology. The image augmentation technology can be at least one of a group of historical image block distortion, historical image block flipping, historical image block color and space changing, and historical image block transformation.

In the embodiment, the image augmentation technology marks a series of random changes to the training images to produce similar but different training examples, to expand the scale of the training data.

At block S305, training the convolutional neural network architecture with the historical image blocks to create a tumor detection model.

In the embodiment, the convolutional neural network architecture includes, but is not limited to, ResNet, AlexNet, VGG, Inception, and so on.

It can be understood that the block S303 and the block S304 can be omitted.

Figure 4:
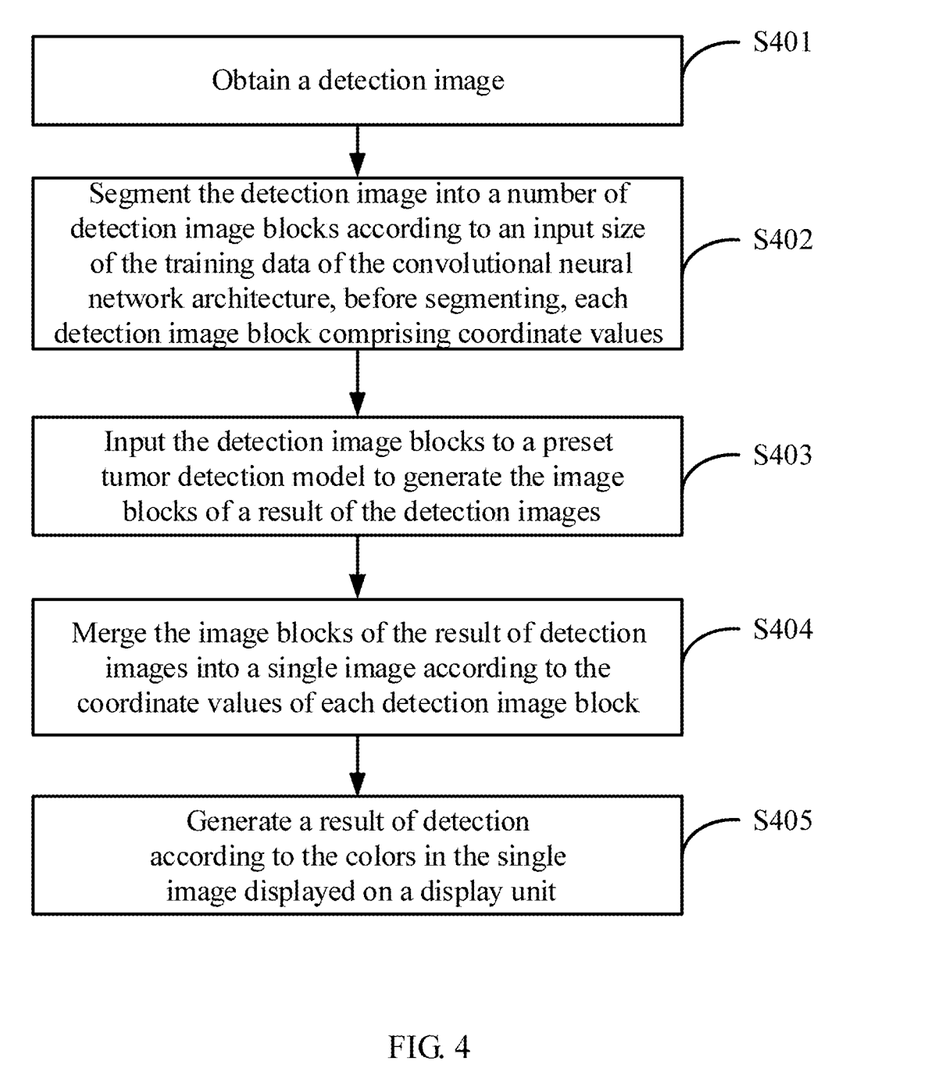
FIG. 4 illustrates a flowchart of an embodiment of a tumor detecting method.

FIG. 4 illustrates a flowchart of an embodiment of a tumor detecting method. The tumor detecting method can begin at block S401.

At block S401, obtaining a detection image.

In the embodiment, the detection image can be thin-section detection image of the lung with high resolution. The detection image can also be thin-section detection image with high resolution of kidney, stomach, or the like.

At block S402, segmenting the detection image into a number of detection image blocks according to the input size of the training data of the convolutional neural network architecture, before segmenting, each detection image block comprising coordinate values.

In the embodiment, the method further includes: determining coordinate values of each detection image block before segmenting. The method segments the detection image into a number of detection image blocks satisfying the input size of the training data according to the input size of the training data of the convolutional neural network architecture, coordinate values of each detection image block being determined before segmenting, each detection image block partially overlapping one or more of adjacent detection image block.

In the embodiment, the detection image block is square. The detection image block can be any other suitable shape, for example rectangle, or the like. Each detection image block overlaps a half size of a longitudinally adjacent one of the detection image blocks and a half size of a widthwise adjacent one of the detection image blocks, and a quarter size of a diagonally adjacent one of the detection image blocks.

It can be understood that, in other embodiments, each detection image block overlaps a quarter size of the longitudinally adjacent one of the detection image blocks or the widthwise adjacent one of the detection image blocks.

At block S403, inputting the detection image blocks to a preset tumor detection model to generate the image blocks of a result of the detection images.

In the embodiment, the method includes inputting the detection image blocks to a preset tumor detection model created at block S305 to generate the image blocks of the result of the detection images.

At block S404, merging the image blocks of the result of detection images into a single image according to the coordinate values of each detection image block.

At block S405, generating a result of detection according to the colors in the single image displayed on the display unit.

In the embodiment, the single image displays normal areas, abnormal areas, and overlapping areas of the abnormal areas in different colors on the display unit. The method judges and generates the result of detection according to the color depths in the single image displayed on the display unit.

Figure 5:
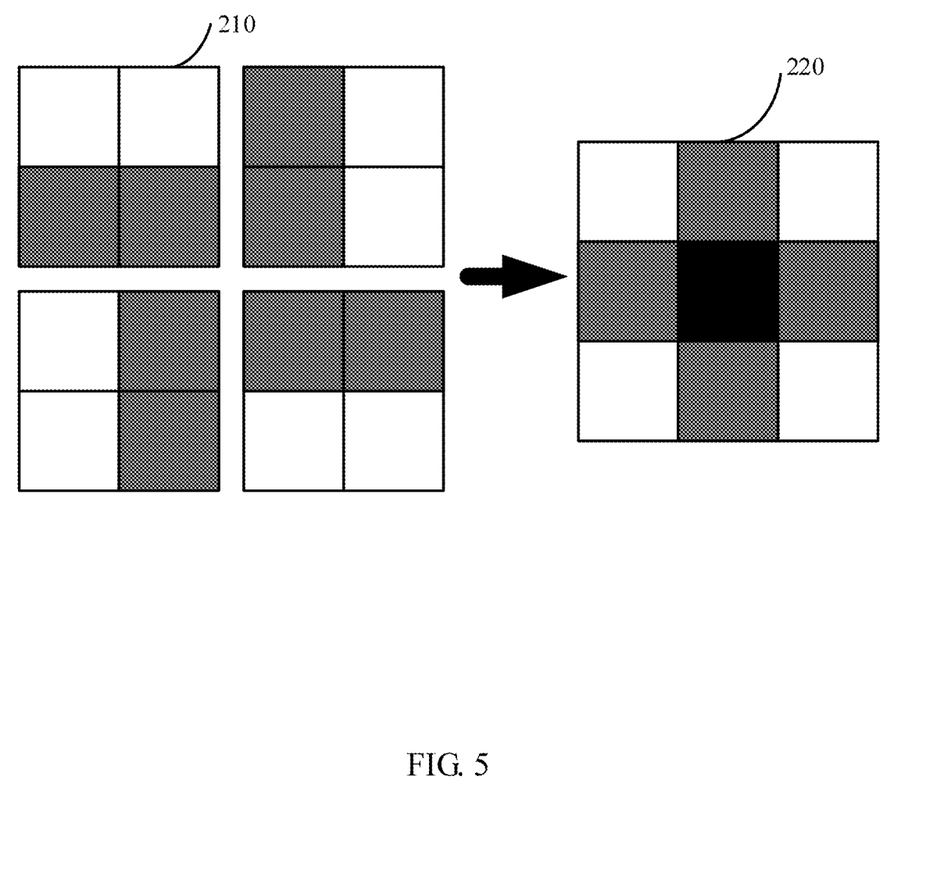
FIG. 5 illustrates a view showing the merging of a number of image blocks into an image of result of detection.

FIG. 5 illustrates the merging of a number of image blocks into a single image of result of detection. The four image blocks of the result of detection images 210 are merged into a single image 220 according to the coordinate values of each detection image block. In the embodiment, the shape of the detection image block is same as the shape of the image blocks of the result of detection image 210. Each detection image block is square. Each detection image block overlaps a half size of the longitudinally adjacent one of the detection image blocks and a half size of the widthwise adjacent one of the detection image blocks, and a quarter size of the diagonally adjacent one of the detection image blocks.

As shown in FIG. 5, the image block of the result of detection images 210 displays the normal area and the abnormal area in different color on the display unit. In detail, the four image blocks of the result of detection image 210 display normal area in white and display abnormal area in gray on the display unit. To generate the single image 220, adjacent image blocks of the result of detection image 210 are partially overlapped. The single image 220 displays the normal areas in white, the overlapping area of normal areas in white, the abnormal areas in gray, the overlapping area of one abnormal area and three normal areas in gray, the overlapping area of two or three abnormal areas and one or two normal areas in dark gray, and the overlapping area of four abnormal areas in dark. To analyze the single image 220, the result of detection is generated according to the color depths of the overlapped area displayed on the display unit. For example, the dark gray is the place where the tumor is spreading, and the tumor is in the dark place.

It can be understood that, the single image 220 displays the normal areas, the abnormal areas, and the overlapping areas of the abnormal areas in different colors on the display unit. The method judges and generates the result of detection according to the color depths in the single image displayed on the display unit.

It can be understood that, in other embodiments, the number of detection image blocks are greater than four.

It can be understood that, in other embodiments, a number of detection images can be employed. The detection images can be merged into a whole image. The whole image can display the whole lung. A number of images of the result of detection can be generated according to the detection images and the tumor detection model. The images of the result of detection can be merged into an overall image, and the result of detection of the lung can be determined according to the overall image.

The tumor detection device and method, and non-transitory storage medium segments the detection image into a number of detection image blocks according to the input size of the training data of the convolutional neural network architecture. Then, the detection image blocks are inputted to the tumor detection model to generate the image blocks of the result of detection images. Next, the image blocks of the result of detection images are merged into a single image to generate a result of detection according to the coordinate values of each detection image block. Thus, the existence of a tumor and the accurate location of the tumor can be known according to the result of detection. The detection speed and the detection accuracy are improved.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A tumor detection device comprising:
a display unit;
a storage system;
at least one processor; and
the storage system storing one or more programs, which when executed by the at least one processor, causing the at least one processor to:
obtain one or more detection images;
segment the detection images into a plurality of detection image blocks according to an input size of training data of a convolutional neural network architecture, before segmenting, each of the plurality of detection image blocks comprising coordinate values; each of the detection image blocks partially overlapping with one or more of adjacent detection image blocks;
input the detection image blocks to a preset tumor detection model to generate a plurality of image blocks of a result of the detection images;
merge the plurality of image blocks of the result of detection images into a composite single image according to the coordinate values of each of the detection image blocks, wherein the single image displays normal areas, abnormal areas, and overlapped areas of the abnormal areas in different colors on the display unit; in the image blocks of the result of the detection images, each of the normal areas being displayed in white and each of the abnormal areas being displayed in gray; according to the number of the abnormal areas in each of the overlapped areas of the composite single image being, in order, zero, greater than zero but less than a first threshold, greater than the first threshold but less than a second threshold, and equal to or greater than the second threshold, a corresponding color depth displayed in the composite single image being white, gray, dark gray, and dark; the second threshold representing the overlapped area being all the abnormal areas without normal areas; the four different color depths in the single image representing three different degrees of a tumor;

generate a result of detection according to color depths in the single image displayed on the display unit.

2. The tumor detection device as described in claim 1, wherein:

each of the plurality of detection image blocks is rectangular.

3. The tumor detection device as described in claim 2, wherein:

each of the detection image blocks overlaps a half size of a longitudinally adjacent one of the detection image blocks and a half size of a widthwise adjacent one of the detection image blocks, and a quarter size of a diagonally adjacent one of the detection image blocks.

4. The tumor detection device as described in claim 1, further causing the at least one processor to:

obtain one or more historical images;

segment the historical images into a plurality of historical image blocks according to the input size of the training data of the convolutional neural network architecture;

train the convolutional neural network architecture with the historical image blocks to create the tumor detection model.

5. The tumor detection device as described in claim 4, after causing the at least one processor to segment the historical images into a plurality of historical image blocks according to the input size of the training data of the convolutional neural network architecture, further causing the at least one processor to:

delete one or more of the historical image blocks comprising backgrounds of more than 50% of an entire historical image block.

6. The tumor detection device as described in claim 5, further causing the at least one processor to:

expand a scale of the historical image blocks based on an image augmentation technology, the image augmentation technology comprising at least one of a group of image distortion, image flipping, image color and space changing, and image transformation.

7. A tumor detection method applicable in a tumor detection device with a display unit, a storage system, and at least one processor, comprising:

the at least one processor obtaining one or more detection images;

the at least one processor segmenting the detection images into a plurality of detection image blocks according to an input size of training data of a convolutional neural network architecture, before segmenting, each of the plurality of detection image blocks comprising coordinate values; each of the detection image blocks partially overlapping with one or more of adjacent detection image blocks;

the at least one processor inputting the detection image blocks to a preset tumor detection model to generate a plurality of image blocks of a result of the detection images;

the at least one processor merging the plurality of image blocks of the result of detection images into a composite single image according to the coordinate values of each of the detection image blocks, wherein the single image displays normal areas, abnormal areas, and overlapped areas of the abnormal areas in different colors on the display unit; in the image blocks of the result of the detection images, each of the normal areas being displayed in white and each of the abnormal areas being displayed in gray; according to the number of the abnormal areas in each of the overlapped areas of the composite single image being, in order, zero, greater than zero but less than a first threshold, greater than the first threshold but less than a second threshold, and equal to or greater than the second threshold, a corresponding color depth displayed in the composite single image being white, gray, dark gray, and dark; the second threshold representing the overlapped area being all the abnormal areas without normal areas; the four different color depths in the single image representing three different degrees of a tumor;

the at least one processor generating a result of detection according to color depths in the single image displayed on the display unit.

8. The tumor detection method as described in claim 7, wherein the method comprises:

the at least one processor segmenting the detection images into a plurality of rectangle detection image blocks according to an input size of training data of a convolutional neural network architecture.

9. The tumor detection method as described in claim 8, wherein:

each of the detection image blocks overlaps a half size of a longitudinally adjacent one of the detection image blocks and a half size of a widthwise adjacent one of the detection image blocks, and a quarter size of a diagonally adjacent one of the detection image blocks.

10. The tumor detection method as described in claim 7, wherein the method further comprises:

the at least one processor obtaining one or more historical images;

the at least one processor segmenting the historical images into a plurality of historical image blocks according to the input size of the training data of the convolutional neural network architecture;

the at least one processor training the convolutional neural network architecture with the historical image blocks to create the tumor detection model.

11. The tumor detection method as described in claim 10, after the at least one processor segmenting the historical images into a plurality of historical image blocks according to the input size of the training data of the convolutional neural network architecture, wherein the method further comprises:

the at least one processor deleting one or more of the historical image blocks comprising backgrounds of more than 50% of an entire historical image block.

12. The tumor detection method as described in claim 11, wherein the method further comprises:

the at least one processor expanding a scale of the historical image blocks based on an image augmentation technology, the image augmentation technology comprising at least one of a group of image distortion, image flipping, image color and space changing, and image transformation.

13. A non-transitory storage medium storing a set of instructions, when the instructions being executed by at least one processor of a tumor detection device, causing the at least one processor to:

obtain one or more detection images;
segment the detection images into a plurality of detection image blocks according to an input size of training data of a convolutional neural network architecture, before segmenting, each of the plurality of detection image blocks comprising coordinate values; each of the detection image blocks partially overlapping with one or more of adjacent detection image blocks;
input the detection image blocks to a preset tumor detection model to generate a plurality of image blocks of a result of the detection images;
merge the plurality of image blocks of the result of detection images into a composite single image according to the coordinate values of each of the detection image blocks, wherein the single image displays normal areas, abnormal areas, and overlapped areas of the abnormal areas in different colors on the display unit; in the image blocks of the result of the detection images, each of the normal areas being displayed in white and each of the abnormal areas being displayed in gray; according to the number of the abnormal areas in each of the overlapped areas of the composite single image being, in order, zero, greater than zero but less than a first threshold, greater than the first threshold but less than a second threshold, and equal to or greater than the second threshold, a corresponding color depth displayed in the composite single image being white, gray, dark gray, and dark; the second threshold representing the overlapped area being all the abnormal areas without normal areas; the four different color depths in the single image representing three different degrees of a tumor;
generate a result of detection according to color depths in the single image displayed on the display unit.

14. The non-transitory storage medium as described in claim 13, wherein:
each of the plurality of detection image blocks is rectangular.

15. The non-transitory storage medium as described in claim 14, wherein:
each of the detection image blocks overlaps a half size of a longitudinally adjacent one of the detection image blocks and a half size of a widthwise adjacent one of the detection image blocks, and a quarter size of a diagonally adjacent one of the detection image blocks.

16. The non-transitory storage medium as described in claim 13, further causing the at least one processor to:
obtain one or more historical images;
segment the historical images into a plurality of historical image blocks according to the input size of the training data of the convolutional neural network architecture;
train the convolutional neural network architecture with the historical image blocks to create the tumor detection model.

17. The non-transitory storage medium as described in claim 16, causing the at least one processor to segment the historical images into a plurality of historical image blocks according to the input size of the training data of the convolutional neural network architecture, further causing the at least one processor to:
delete one or more of the historical image blocks comprising backgrounds of more than 50% of an entire historical image block.

18. The non-transitory storage medium as described in claim 17, further causing the at least one processor to:
expand a scale of the historical image blocks based on an image augmentation technology, the image augmentation technology comprising at least one of a group of image distortion, image flipping, image color and space changing, and image transformation.

* * * * *